UNITED STATES PATENT OFFICE.

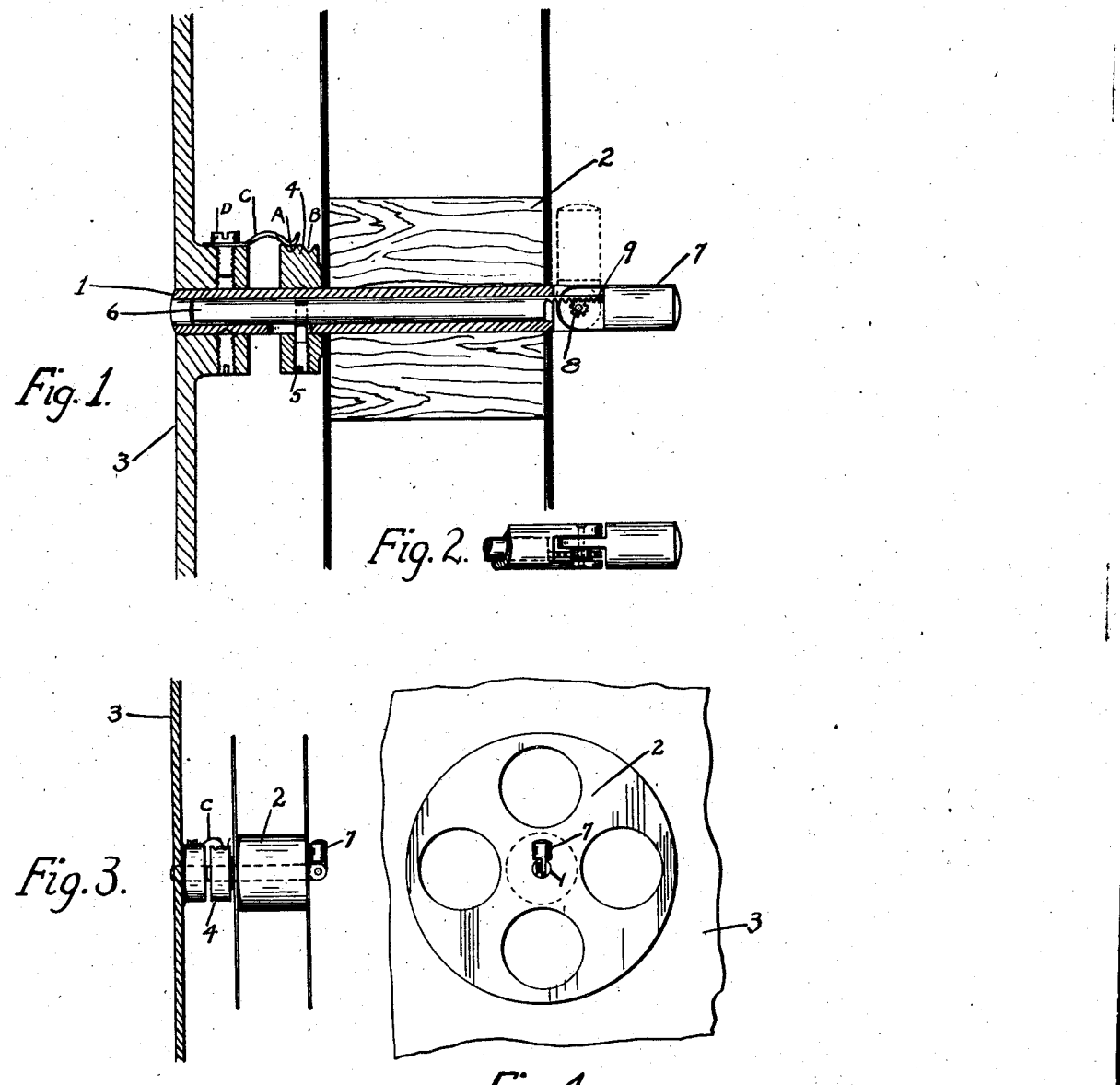

CHARLES UEBELMESSER, OF NEW YORK, N. Y., ASSIGNOR TO CRU PATENTS CORPORATION, A CORPORATION OF NEW YORK.

FILM-REEL SHAFT.

1,227,094. Specification of Letters Patent. Patented May 22, 1917.

Application filed July 20, 1915. Serial No. 40,987.

*To all whom it may concern:*

Be it known that I, CHARLES UEBELMESSER, a subject of the Emperor of Germany, residing at New York city, in the county and State of New York, have invented certain new and useful Improvements in Film-Reel Shafts, of which the following is a clear, full, and exact description.

This invention relates to an improvement on a reel carrying shaft, and particularly the means which hold the reel in position on the shaft, whereby the locking device closes automatically by the mere action of placing the reel on the shaft.

A further feature of the device is that the lock remains open till a reel is placed on the shaft, which is of great convenience to an operator, especially on moving picture machines where most of the exchanging of reels is done in a great hurry and also in darkness.

As shown in the drawings,

Figure 1 is a vertical section through the device.

Fig. 2 is a perspective view of the lock when open.

Fig. 3 is a perspective view showing the entire device mounted.

Fig. 4 is a side view showing the reel lock closed.

To accomplish the object in view, I provide a reel shaft 1 carrying the reel 2. The shaft 1 is a tube and is mounted in a suitable support 3 (only partly shown). On shaft 1 is mounted a slidable collar 4, which collar is connected by a screw pin 5, passing through a slot 5ª, with the sliding bar 6. This slide bar actuates the lock member 7, preferably by rack and pinion 8 and 9. The rack 9 is part of the bar 6. When a reel is placed on the shaft 1 and pushed against the collar 4, the collar will slide back and consequently pull the bar 6 and close the lock 7 automatically, and bring the entire device in the position as shown in Fig. 3. When taking the reel off, just a sudden pull on the reel is needed to open the lock and bring collar 4 forward again.

Collar 4 is provided with two grooves, A and B, which engage a tension spring C for the purpose of holding the collar firmly in the two positions, namely, open and closed. The spring C is fastened to the frame 3 by screws D. In a revolving shaft the spring D can be fastened directly on the shaft or elsewhere, but it is imperative that the spring D be independent of the longitudinal movement of the collar 4.

The device can be considerably altered without departing from the principle thereof.

What I claim is:

1. A film roll support, consisting of a lever pivotally mounted in a tubular shaft, a movable collar on said shaft, a tension spring on said shaft holding the collar in position a sliding bar in said shaft connected with said collar, and the pivotally mounted lever.

2. A film roll support, a slidable collar on said support, a pivotally mounted lever on the end of the support, a connection bar in the support and connected with the collar and the pivotally mounted lever and adapted to be operable by moving the collar or the lever aforesaid.

Signed at New York city, New York, this twenty-first day of June, one thousand nine hundred and fifteen.

CHARLES UEBELMESSER.

Witnesses:
  WILLIAM WENDERHOLD,
  ALBERT H. T. BANZHAF.